US010830284B2

(12) United States Patent
Wang

(10) Patent No.: US 10,830,284 B2
(45) Date of Patent: Nov. 10, 2020

(54) REDUCTION GEARBOX TRANSMISSION SEPARATION MECHANISM

(71) Applicant: ZHEJIANG LINIX MOTOR CO., LTD, Zhejiang (CN)

(72) Inventor: Feng Wang, Zhejiang (CN)

(73) Assignee: ZHEJIANG LINIX MOTOR CO., LTD., Dongyang (CN)

( * ) Notice: Subject to any disclaimer, the term of this patent is extended or adjusted under 35 U.S.C. 154(b) by 105 days.

(21) Appl. No.: 16/234,590

(22) Filed: Dec. 28, 2018

(65) Prior Publication Data
US 2020/0088242 A1 Mar. 19, 2020

(30) Foreign Application Priority Data

Sep. 19, 2018 (CN) .......................... 2018 1 1096675

(51) Int. Cl.
F16D 11/14 (2006.01)
F16D 23/12 (2006.01)
A61G 5/04 (2013.01)
F16H 1/16 (2006.01)

(52) U.S. Cl.
CPC .............. F16D 11/14 (2013.01); F16D 23/12 (2013.01); A61G 5/04 (2013.01); F16D 2023/123 (2013.01); F16H 1/16 (2013.01)

(58) Field of Classification Search
CPC ...... A61G 5/04; F16D 11/14; F16D 2011/004; F16D 23/12; F16D 2023/123; F16H 1/16
See application file for complete search history.

(56) References Cited

U.S. PATENT DOCUMENTS 4,854,434 A * 8/1989 Kurihara ............ B60K 17/3515
192/35
2019/0368237 A1* 12/2019 Distefano ............... F16D 23/12

FOREIGN PATENT DOCUMENTS

GB 2523799 A * 9/2015 ............ F16D 48/062

* cited by examiner

Primary Examiner — Charles A Fox
Assistant Examiner — Lori Wu
(74) Attorney, Agent, or Firm — Jiwen Chen; Jacobson Holman PLLC

(57) ABSTRACT

A reduction gearbox transmission separation mechanism includes a box. A first shaft and a second shaft are disposed in the box. The first shaft is sleeved with a linkage gear, a rotating block, a moving block, and a fixed block. The linkage gear is used for linking the first shaft and the second shaft. The linkage gear is a transmission part in a gear transmission assembly or a worm wheel and worm transmission assembly or a gear worm transmission assembly. The first shaft includes a linkage segment and a fitting segment. The linkage gear is rotatably sleeved on the fitting segment. The moving block is disposed on the linkage segment, and the moving block is axially movable along the linkage segment.

9 Claims, 7 Drawing Sheets

US 10,830,284 B2

REDUCTION GEARBOX TRANSMISSION SEPARATION MECHANISM

CROSS REFERENCE TO RELATED APPLICATIONS

The present application claims the benefit of Chinese Patent Application No. 201811096675.5 filed on Sep. 19, 2018, the contents of which are incorporated herein by reference in its entirety.

TECHNICAL FIELD

The present invention relates to a reduction gearbox, and more particularly relates to a reduction gearbox transmission separation mechanism.

BACKGROUND ART

An existing reduction gearbox includes an input shaft and an output shaft. The input shaft is linked with the output shaft through a transmission assembly. The transmission assembly is a gear transmission assembly or a worm wheel and worm transmission assembly or a gear worm transmission assembly, which has a certain self-locking force. When an electrically powered wheelchair is used, it is difficult to push the electrically powered wheelchair in the case of motor outage due to the self-locking force of the reduction gearbox.

SUMMARY OF THE INVENTION

An object of the present invention is to provide a reduction gearbox transmission separation mechanism, capable of implementing a transmission failure of a reduction gearbox in order to push an electrically powered wheelchair in the case of motor outage.

To achieve the foregoing object, the present invention adopts the following technical solution: a reduction gearbox transmission separation mechanism includes a box; a first shaft and a second shaft are disposed in the box; the first shaft is sleeved with a linkage gear, a rotating block, a moving block, and a fixed block; the linkage gear is used for linking the first shaft and the second shaft; the linkage gear is a transmission part in a gear transmission assembly or a worm wheel and worm transmission assembly or a gear worm transmission assembly; the first shaft includes a linkage segment and a fitting segment; the linkage gear is rotatably sleeved on the fitting segment; the moving block is disposed on the linkage segment, and the moving block is axially movable along the linkage segment; a linkage portion is formed at one end of the moving block; an outer edge of the linkage portion is located on an outer circumferential side of an outer edge of the moving block; a linkage protrusion and a linkage groove fitting each other are formed with the linkage gear on an axial surface of the linkage portion; the linkage groove is provided along an axis parallel line of the first shaft; a limiting portion is formed at the other end of the moving block; an outer edge of the limiting portion is located on the outer circumferential side of the outer edge of the moving block; the rotating block is sleeved on the moving block and is located between the limiting portion and the linkage portion; the fixed block is sleeved outside the moving block and is fixed to the box, and a through groove which penetrates in a front-back direction to reserve space for the rotating block is formed in the fixed block; multiple first protrusions and multiple second protrusions are formed on an axial surface, away from the linkage gear, of the fixed block; the first protrusions and the second protrusions are alternately disposed to define a circle; an axial thickness of the first protrusions along a clockwise rotation direction is increased; an axial surface of a clockwise rotation direction end of the first protrusion is located on a front side of an axial surface of the second protrusion, and an axial surface of an anticlockwise rotation direction end of the first protrusion is located on a rear side of the axial surface of the second protrusion; a rotating protrusion is formed on the rotating block; when the rotating block rotates to make the rotating protrusion located at the anticlockwise rotation direction end of the first protrusion, the moving block is linked with the linkage gear; and when the rotating block rotates to make the rotating protrusion located at the clockwise rotation direction end of the first protrusion, the moving block moves along the first shaft to a side away from the linkage gear and makes the linkage protrusion separated from the linkage groove.

When the reduction gearbox of the present invention is used, the rotating block is rotated clockwise relative to the fixed block, when the rotating protrusion of the rotating block moves from the first protrusion to the second protrusion, the rotating block will move along a shaft to a side away from the linkage gear since an axial thickness of the first protrusion is larger than an axial thickness of the second protrusion, and the rotating block urges against the limiting portion to drive the moving block to move along the first shaft, so that a certain distance is formed between the moving block and the linkage gear, the linkage protrusion is separated from the linkage groove, the moving block is separated from the linkage gear, the moving block is not linked with the linkage gear any longer, the rotation of the first shaft only drives the rotation of the moving block instead of the rotation of the linkage gear, so as to realize transmission separation, the first shaft of the reduction gearbox is not linked with the second shaft not longer, and when an electrically powered wheelchair adopting the reduction gearbox of the present invention is pushed, a resistance is lower. A specific position of the structure of the present invention is set as required, so the first shaft may serve as an output shaft, or the first shaft may serve as an input shaft. The axial limitation of the linkage gear is performed in various existing conventional modes, a step may be formed on the first shaft, and an oil bearing having the step is disposed between the first shaft and the linkage gear, so that two axial ends of the linkage gear can be positioned.

When the first shaft needs to be linked with the linkage gear, the rotating block can be continuously rotated clockwise since the first protrusion and the second protrusion are alternately disposed, so that the rotating protrusion falls from the second protrusion to the first protrusion; and since the axial thickness of the first protrusion along a clockwise rotation direction is increased, the rotating protrusion will fall on a thinnest part of the axial thickness of the first protrusion, so that the rotating block moves along the first shaft to a side close to the linkage gear, the rotating block is restored, the rotating block pushes the moving block to move toward the linkage gear, the moving block is restored, the linkage protrusion is re-fitted in the linkage groove, and the first shaft is linked with the linkage gear.

Preferably, the first shaft is sleeved with a spring, one end of the spring is fixed to the rotating block, and the other end of the spring is fixed to the box.

The arrangement of the spring facilitates the restoration of the moving block, and the spring is also used for limiting an on-axis displacement stroke of the moving block.

Preferably, a positioning groove is formed between an axial end surface of the second protrusion and the clockwise rotation direction end of the first protrusion, a groove wall of the positioning groove has a slope structure connected to the axial surface of the second protrusion, and various parts, deviating from the positioning groove, of the second protrusion have the same axial thickness.

The foregoing arrangement makes the axial movement displacement of the rotating block of the present invention shorter, makes the structure of the present invention compact, and minimizes the size of the reduction gearbox.

Preferably, an outer edge of a radial section of the fitting segment is circular or segmental, and an inner edge of the linkage gear is circular. The foregoing arrangement avoids linkage of the linkage gear and the first shaft.

Preferably, a radial section of the linkage segment is regularly polygonal, and the shape of an inner edge of the moving block is the same as the shape of an outer edge of a circumferential direction of the linkage segment of the first shaft; or, the linkage segment is provided with a key, a key groove for fitting the key is formed in the moving block, and an axial length of the key groove is larger than a length of the key. The foregoing arrangement drives the moving block to rotate when the first shaft rotates.

Preferably, the rotating block is provided with a handle, the handle extending out of the box. The arrangement of the handle is convenient for a user to perform a separation operation and a linkage operation of the moving block and the linkage gear.

Preferably, the rotating block includes a driving rotating block and a driven rotating block, the driven rotating block is limited between the limiting portion and the linkage portion, the driven rotating block includes a first rotating block segment and a second rotating block segment, the rotating protrusion is disposed on the second rotating block segment, an outer diameter of the second rotating block segment is larger than an outer diameter of the first rotating block segment, the driving rotating block has a second through groove penetrating along the first shaft in a front-back direction, the driving rotating block is sleeved on the first rotating block segment, the driving rotating block is limited between the spring and the second rotating block segment, and ratchet mechanisms fitting each other are disposed between an axial end surface of the driving rotating block and an axial end surface of the second rotating block segment.

The foregoing arrangement realizes the movement of the rotating protrusion only when the driving rotating block rotates clockwise, and makes the driving rotating block revolved on the driven rotating block when the driving rotating block rotates anticlockwise, thereby preventing the driven rotating block from exerting a force on the fixed block, so as to protect the structure stability of parts of the present invention.

Preferably, the rotating protrusion is cylindrical, and a cambered surface of the rotating protrusion is in contact with the axial surface of the first protrusion or the axial surface of the second protrusion. The foregoing arrangement reduces a contact area between the rotating protrusion and the fixed block, in order for the rotation of the rotating block.

Preferably, the limiting portion and the moving block are split, the limiting portion is annular, a clamping spring is fixed to an end, away from the linkage gear, of the moving block, and the limiting portion is limited between the clamping spring and the axial surface, away from the linkage gear, of the rotating block. The foregoing arrangement is convenient for limiting the rotating block between the limiting portion and a fixing portion, and convenient for assembling parts of the present invention.

The present invention has the advantage that a transmission failure of a reduction gearbox can be implemented in order to push an electrically powered wheelchair in the case of motor outage.

DETAILED DESCRIPTION OF THE INVENTION

Figure 1:
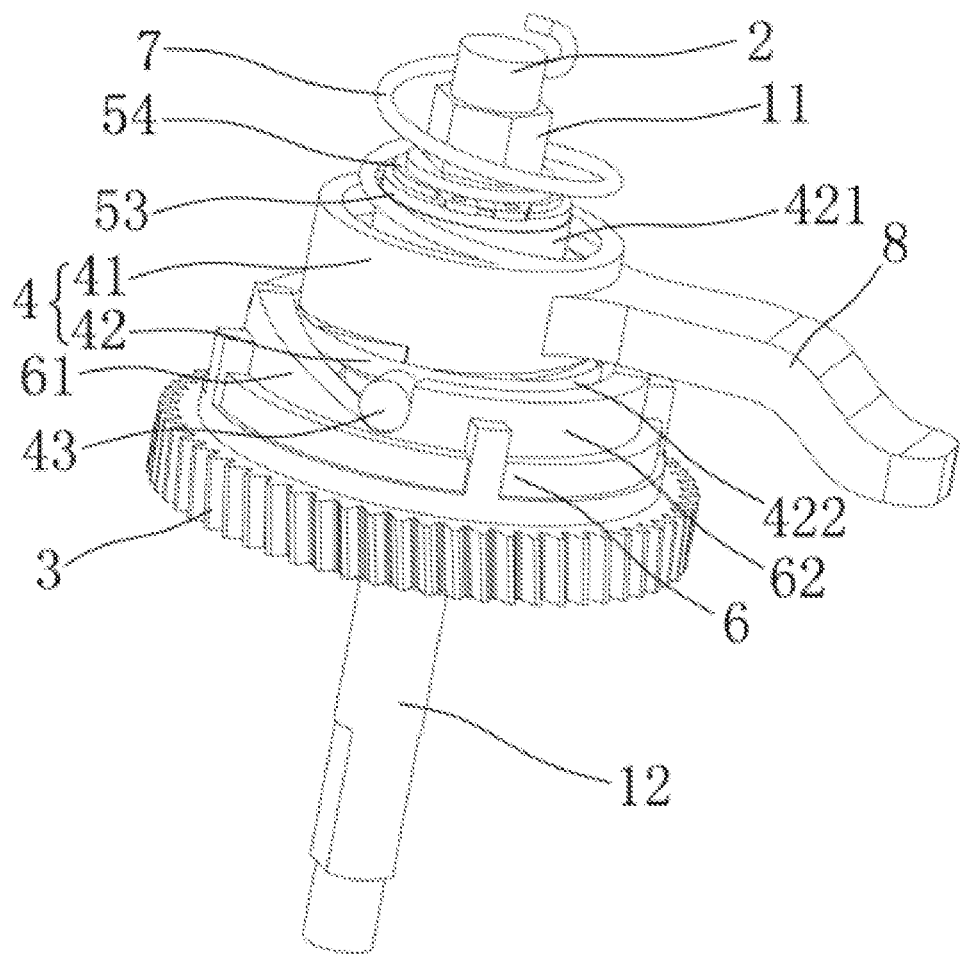
FIG. 1 is a structure schematic diagram of a scenario where a box is removed according to the present invention.
Figure 2:
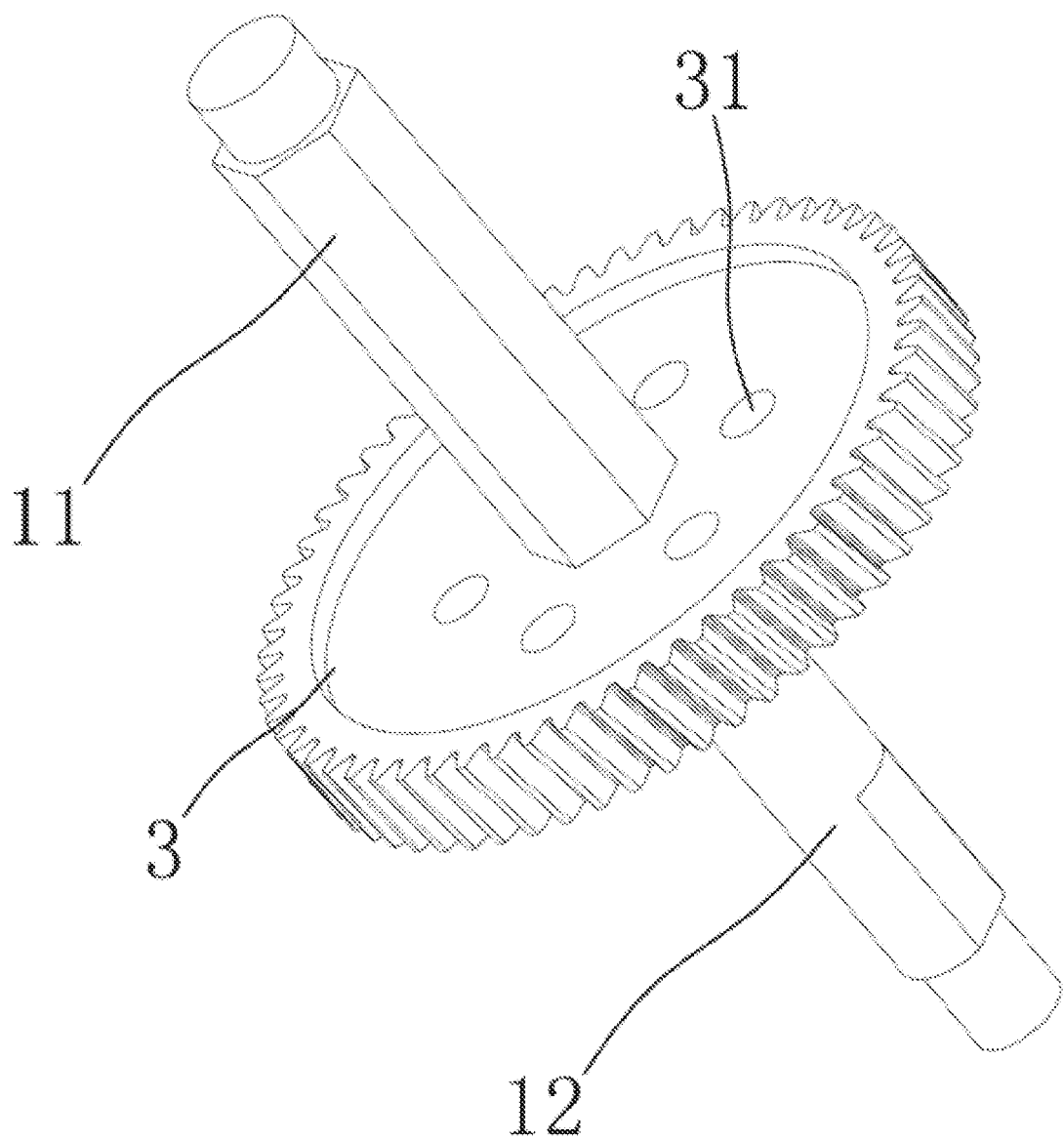
FIG. 2 is a structure schematic diagram of a scenario where a linkage gear fits a first shaft according to the present invention.
Figure 3:
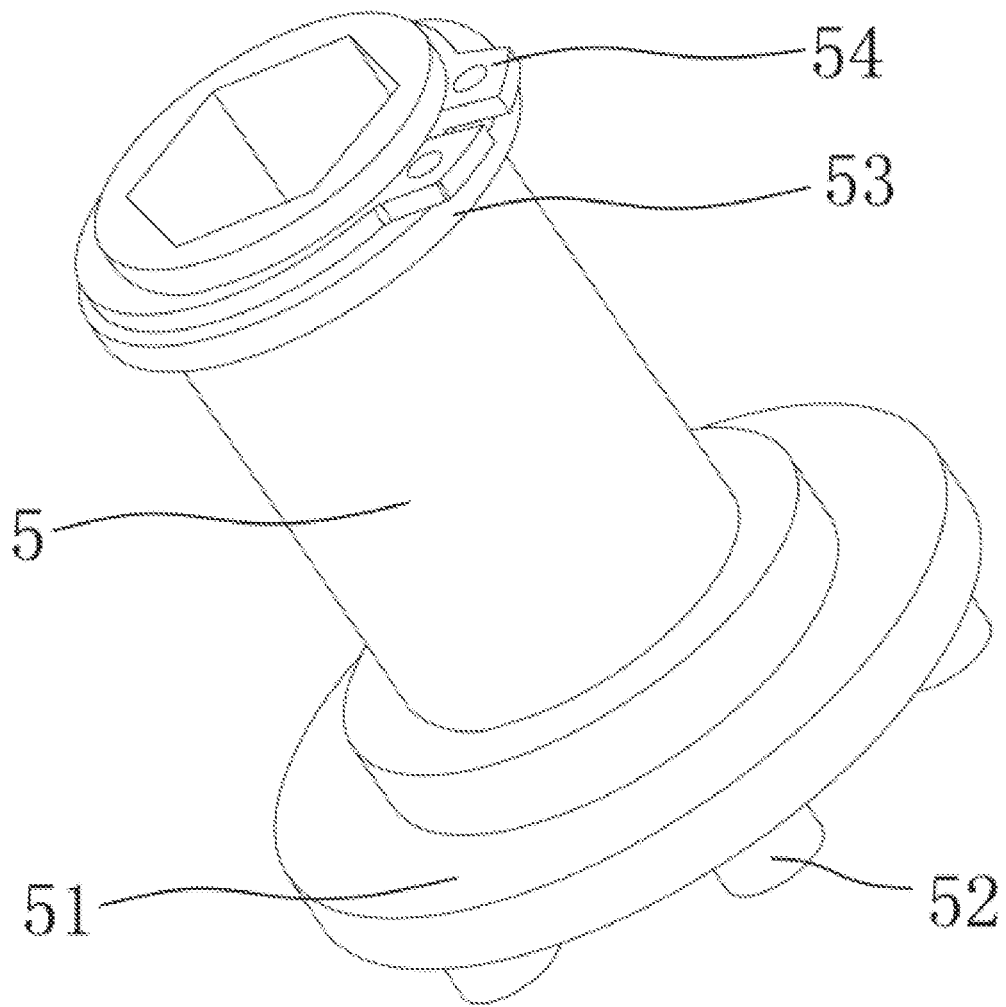
FIG. 3 is a structure schematic diagram of a moving block according to the present invention.
Figure 4:
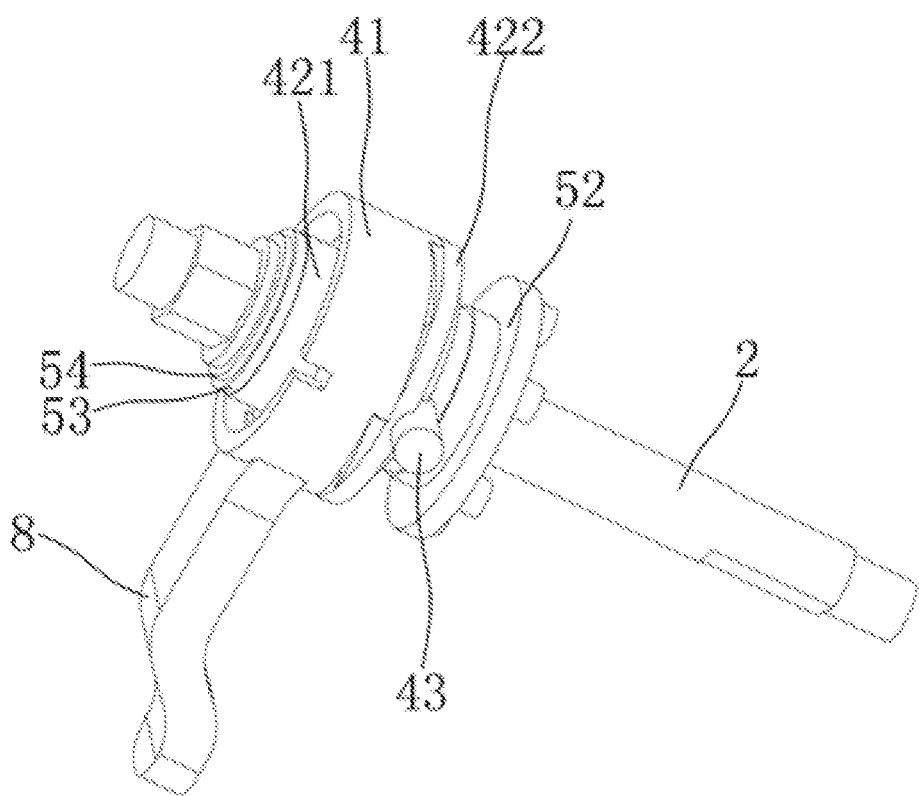
FIG. 4 is a structure schematic diagram of a scenario where a rotating block fits a moving block according to the present invention.
Figure 5:
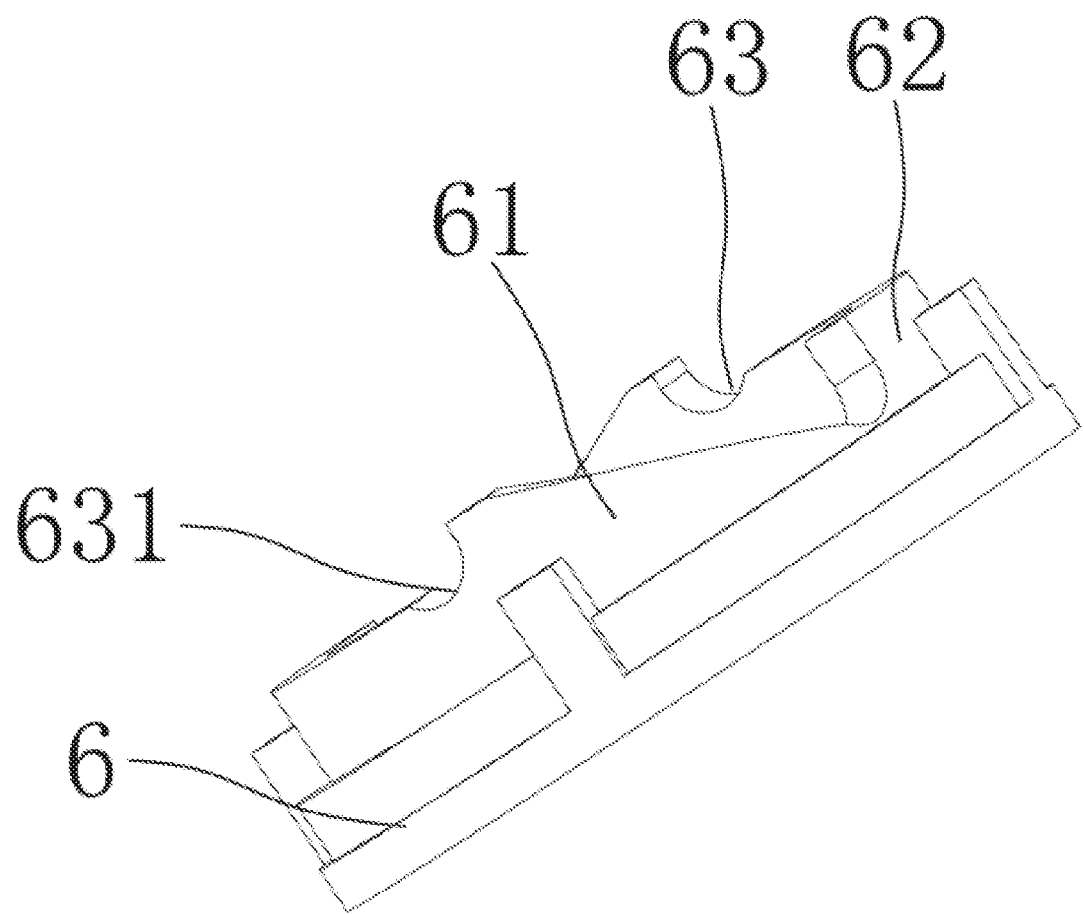
FIG. 5 is a structure schematic diagram of a fixed block according to the present invention.

The present invention is further described hereinafter according to the drawings and specific embodiments.

As shown in FIG. 1 to FIG. 7, a reduction gearbox transmission separation mechanism of the present invention includes a box 1, A first shaft 2 and a second shaft are disposed in the box 1. The first shaft 1 is sleeved with a linkage gear 3, a rotating block 4, a moving block 5, and a fixed block 6. The linkage gear 3 is used for linking the first shaft 2 and the second shaft. The linkage gear 3 is a transmission part in a gear transmission assembly or a worm wheel and worm transmission assembly or a gear worm transmission assembly.

As shown in FIG. 1 to FIG. 4, the first shaft 1 includes a linkage segment 11 and a fitting segment 12. The linkage gear 3 is rotatably sleeved on the fitting segment 12. An inner edge of an inner hole of the linkage gear 3 and an outer edge of the fitting segment 12 of the first shaft are both circular. The moving block 4 is disposed on the linkage segment 11, and the moving block 4 is axially movable along the linkage segment 11. The shape of an inner edge of the moving block is the same as the shape of an outer edge of a circumferential direction of the linkage segment 11. A radial section of the linkage segment 11 is regularly polygonal.

As shown in FIG. 1, FIG. 3, FIG. 4, FIG. 6, and FIG. 7, a linkage portion 51 is formed at one end of the moving block 5. The linkage portion 51 is fixed to the moving block 5. An outer edge of the linkage portion 51 is located on an outer circumferential side of an outer edge of the moving block 5. A linkage protrusion 52 and a linkage groove 31 fitting each other are formed with the linkage gear 3 on an axial surface of the linkage portion 51. The linkage groove 31 is provided along an axis parallel line of the first shaft 2.

A limiting portion 53 is formed at the other end of the moving block 5. An outer edge of the limiting portion 53 is located on the outer circumferential side of the outer edge of the moving block 5. The rotating block 4 is sleeved on the moving block 5 and is located between the limiting portion 53 and the linkage portion 52. The first shaft 2 is sleeved with a spring 7, one end of the spring 7 is fixed to the rotating block 4, and the other end of the spring 7 is fixed to the box 1.

The rotating block 4 includes a driving rotating block 41 and a driven rotating block 42, the driven rotating block 42 is limited between the limiting portion 53 and the linkage portion 52, the driven rotating block 42 includes a first rotating block segment 421 and a second rotating block segment 422, a rotating protrusion 43 is disposed on the second rotating block segment 422, an outer diameter of the second rotating block segment 422 is larger than an outer diameter of the first rotating block segment 411, the driving rotating block 41 has a second through groove penetrating along the first shaft 2 in a front-back direction, the driving rotating block 41 is sleeved on the first rotating block segment 421, the driving rotating block 41 is limited between the spring 7 and the second rotating block segment 422, and ratchet mechanisms fitting each other are disposed between an axial end surface of the driving rotating block 41 and an axial end surface of the second rotating block segment 422.

The rotating block 4 includes a driving rotating block 41 and a driven rotating block 42, the driving rotating block 41 is limited between the spring 7 and the driven rotating block 42, ratchet mechanisms fitting each other are disposed between the axial end surface of the driving rotating block 41 and the axial end surface of the driven rotating block 42, the driving rotating block 41 is provided with a handle 8, the handle 8 extends out of the box 1, and an arc-shaped groove reserving space for the handle is formed in the box 1.

As shown in FIG. 1 and FIG. 5 to FIG. 7, the fixed block 6 is sleeved outside the moving block 5 and is fixed to the box 1, and a through groove which penetrates in a front-back direction to reserve space for the rotating block 5 is formed in the fixed block 6. Two first protrusions 61 and two second protrusions 62 are formed on an axial surface, away from the linkage gear 3, of the fixed block 6. The first protrusions 61 and the second protrusions 62 are alternately disposed to define a circle. The axial thickness of the first protrusions 61 along a clockwise rotation direction is increased. An axial surface of a clockwise rotation direction end of the first protrusion 61 is located on a front side of an axial surface of the second protrusion 62, and an axial surface of an anticlockwise rotation direction end of the first protrusion 61 is located on a rear side of the axial surface of the second protrusion 62. A positioning groove 63 is formed between an axial end surface of the second protrusion 62 and the clockwise rotation direction end of the first protrusion 61, a groove wall of the positioning groove 63 has a slope structure 631 connected to the axial surface of the second protrusion 62, and various parts, deviating from the positioning groove 63, of the second protrusion 62 have the same axial thickness.

Figure 6:
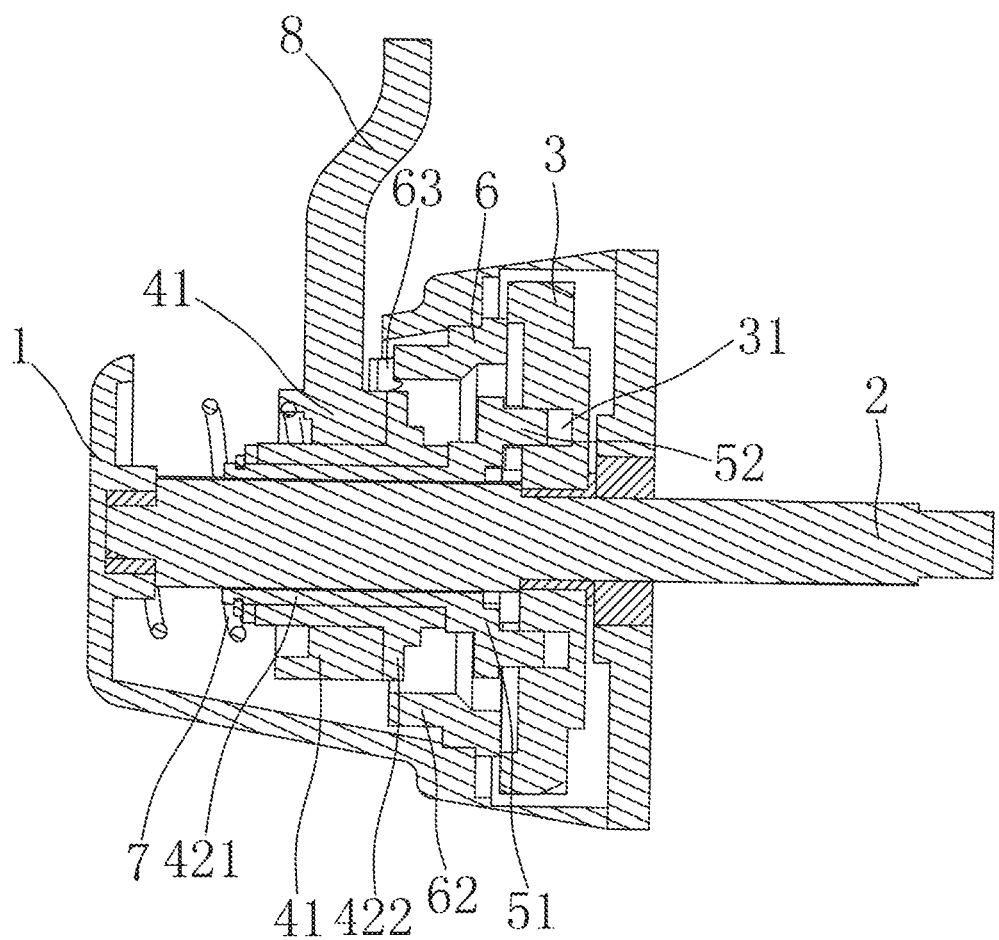
FIG. 6 is a structure schematic diagram of a scenario where a linkage gear is linked with a first shaft according to the present invention.
Figure 7:
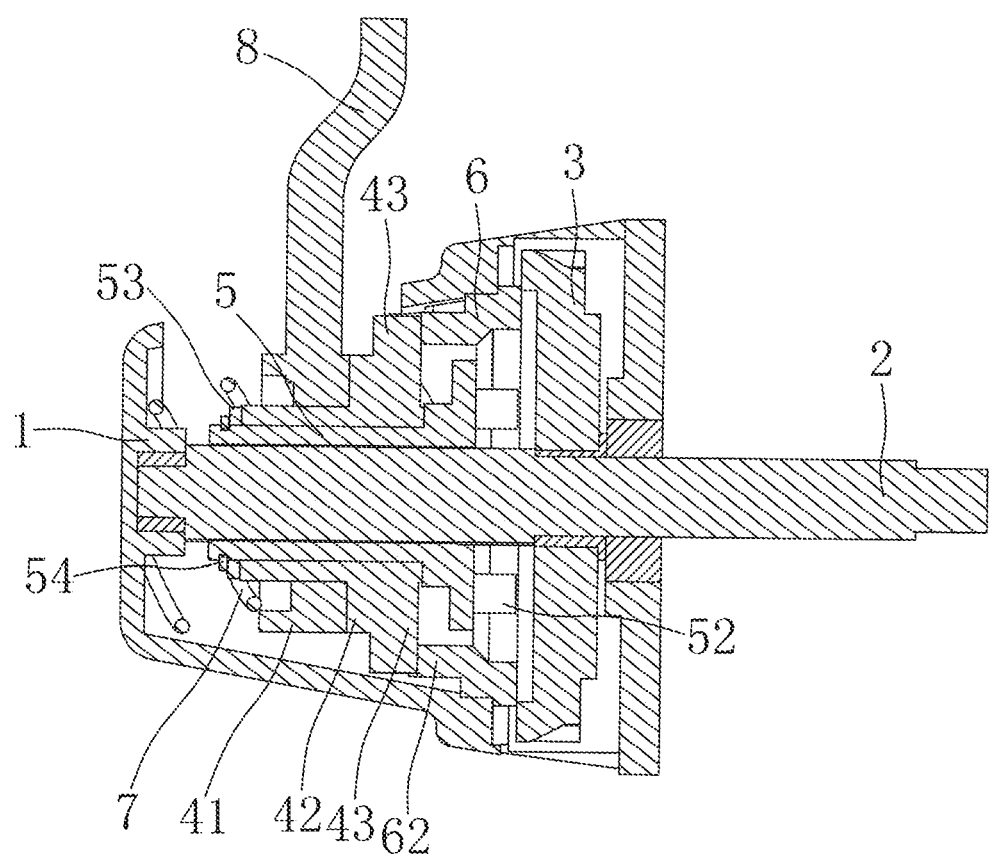
FIG. 7 is a structure schematic diagram of a scenario where a linkage gear is separated from a moving block according to the present invention.

As shown in FIG. 1, FIG. 6 and FIG. 7, a rotating protrusion 43 is formed on the driven rotating block 42 of the rotating block 4. When the rotating block 42 rotates to make the rotating protrusion 43 located at the anticlockwise rotation direction end of the first protrusion 61, the moving block 5 is linked with the linkage gear 32. When the rotating block 4 rotates to make the rotating protrusion 42 located at the clockwise rotation direction end of the first protrusion 61, the moving block 5 moves along the first shaft 2 to a side away from the linkage gear 3 and makes the linkage protrusion 52 separated from the linkage groove 31. The rotating protrusion 42 is cylindrical, and a cambered surface of the rotating protrusion 42 is in contact with the axial surface of the first protrusion 61 or the axial surface of the second protrusion 62.

As shown in FIG. 1, FIG. 4, FIG. 6, and FIG. 7, the limiting portion 53 and the moving block 5 are split, the limiting portion 53 is annular, a clamping spring 54 is fixed to an end, away from the linkage gear 3, of the moving block 5, and the limiting portion 53 is limited between the clamping spring 54 and the axial surface, away from the linkage gear 3, of the rotating block 4.

When the reduction gearbox of the present invention is used, the handle is held to rotate the driving rotating block, so that the rotating block is rotated clockwise relative to the fixed block; when the rotating protrusion of the driven rotating block moves from the first protrusion to the second protrusion, the rotating block will move along a shaft to a side away from the linkage gear since the axial thickness of the first protrusion is larger than the axial thickness of the second protrusion, the rotating protrusion will fall within the positioning groove, and the rotating block urges against the limiting portion to drive the moving block to move along the first shaft, so that a certain distance is formed between the moving block and the linkage gear, the linkage protrusion is separated from the linkage groove, the moving block is separated from the linkage gear, the moving block is not linked with the linkage gear any longer, the rotation of the first shaft only drives the rotation of the moving block instead of the rotation of the linkage gear, so as to realize transmission separation, and the first shaft of the reduction gearbox is not linked with the second shaft any longer.

When the first shaft needs to be linked with the linkage gear, the handle can be continuously rotated clockwise since the first protrusion and the second protrusion are alternately disposed, so that the rotating protrusion falls from the second protrusion to the first protrusion; and since the axial thickness of the first protrusion along a clockwise rotation direction is increased, the rotating protrusion will fall on a thinnest part of the axial thickness of the first protrusion, so that the rotating block moves along the first shaft to a side close to the linkage gear, the rotating block is restored, the rotating block pushes the moving block to move toward the linkage gear, the moving block is restored, the linkage protrusion is re-fitted in the linkage groove, and the first shaft is linked with the linkage gear.

The present invention has the advantage that a transmission failure of a reduction gearbox can be implemented in order to push an electrically powered wheelchair in the case of motor outage.

What is claimed is:

1. A reduction gearbox transmission separation mechanism, characterized by comprising a box, wherein a first shaft and a second shaft are disposed in the box; the first shaft is sleeved with a linkage gear, a rotating block, a moving block, and a fixed block; the linkage gear is used for linking the first shaft and the second shaft; the linkage gear is a transmission part in a gear transmission assembly or a worm wheel and worm transmission assembly or a gear worm transmission assembly; the first shaft comprises a linkage segment and a fitting segment; the linkage gear is rotatably sleeved on the fitting segment; the moving block is disposed on the linkage segment, and the moving block is axially movable along the linkage segment; a linkage portion is formed at one end of the moving block; an outer edge of the linkage portion is located on an outer circumferential side of an outer edge of the moving block; a linkage protrusion and a linkage groove fitting each other are formed with the linkage gear on an axial surface of the linkage portion; the linkage groove is provided along an axis parallel line of the first shaft; a limiting portion is formed at the other end of the moving block; an outer edge of the limiting portion is located on the outer circumferential side of the outer edge of the moving block; the rotating block is sleeved on the moving block and is located between the limiting portion and the linkage portion; the fixed block is sleeved outside the moving block and is fixed to the box, and a first through groove which penetrates in an axial direction to reserve space for the rotating block is formed in the fixed block; multiple first protrusions and multiple second protrusions are formed on an axial surface, away from the linkage gear, of the fixed block; the first protrusions and the second protrusions are alternately disposed to define a circle; an axial thickness of the first protrusions along a first circumferential rotation direction is increased; an axial surface of a first circumferential rotation direction end of the first protrusion is located on a first circumferential position of an axial surface of the second protrusion, and an axial surface of a second circumferential rotation direction end of the first protrusion is located on a second circumferential position of the axial surface of the second protrusion; a rotating protrusion is formed on the rotating block; when the rotating block rotates to make the rotating protrusion located at the second circumferential rotation direction end of the first protrusion, the moving block is linked with the linkage gear; and when the rotating block rotates to make the rotating protrusion located at the first circumferential rotation direction end of the first protrusion, the moving block moves along the first shaft to a side away from the linkage gear and makes the linkage protrusion separated from the linkage groove.

2. The reduction gearbox transmission separation mechanism according to claim 1, characterized in that the first shaft is sleeved with a spring, one end of the spring is fixed to the rotating block, and the other end of the spring is fixed to the box.

3. The reduction gearbox transmission separation mechanism according to claim 1, characterized in that a positioning groove is formed between an axial end surface of the second protrusion and the first circumferential rotation direction end of the first protrusion, a groove wall of the positioning groove has a slope structure connected to the axial surface of the second protrusion.

4. The reduction gearbox transmission separation mechanism according to claim 1, characterized in that an outer edge of a radial section of the fitting segment is circular or segmental, and an inner edge of the linkage gear is circular.

5. The reduction gearbox transmission separation mechanism according to claim 1, characterized in that a radial section of the linkage segment is regularly polygonal, and the shape of an inner edge of the moving block is the same as the shape of an outer edge of a circumferential direction of the linkage segment of the first shaft; or, the linkage segment is provided with a key, a key groove for fitting the key is formed in the moving block, and an axial length of the key groove is larger than a length of the key.

6. The reduction gearbox transmission separation mechanism according to claim 1, characterized in that the rotating block is provided with a handle, the handle extending out of the box.

7. The reduction gearbox transmission separation mechanism according to claim 2, characterized in that the rotating block comprises a driving rotating block and a driven rotating block, the driven rotating block is limited between the limiting portion and the linkage portion, the driven rotating block comprises a first rotating block segment and a second rotating block segment, the rotating protrusion is disposed on the second rotating block segment, an outer diameter of the second rotating block segment is larger than an outer diameter of the first rotating block segment, the driving rotating block has a second through groove penetrating along the first shaft in an axial direction, the driving rotating block is sleeved on the first rotating block segment, the driving rotating block is limited between the spring and the second rotating block segment, and ratchet mechanisms fitting each other are disposed between an axial end surface of the driving rotating block and an axial end surface of the second rotating block segment.

8. The reduction gearbox transmission separation mechanism according to claim 1, characterized in that the rotating protrusion is cylindrical, and a cambered surface of the rotating protrusion is in contact with the axial surface of the first protrusion or the axial surface of the second protrusion.

9. The reduction gearbox transmission separation mechanism according to claim 1, characterized in that the limiting portion and the moving block are split, the limiting portion is annular, a clamping spring is fixed to an end, away from the linkage gear, of the moving block, and the limiting portion is limited between the clamping spring and the axial surface, away from the linkage gear, of the rotating block.

\* \* \* \* \*